(12) United States Patent
Fredette et al.

(10) Patent No.: US 7,525,315 B2
(45) Date of Patent: Apr. 28, 2009

(54) RESISTIVITY LOGGING TOOL AND METHOD FOR BUILDING THE RESISTIVITY LOGGING TOOL

(75) Inventors: Mark A. Fredette, Houston, TX (US);
James Stephen Hall, Houston, TX (US);
Mark T. Frey, Sugar Land, TX (US);
Dominique Dion, Plaisir (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 561 days.

(21) Appl. No.: 10/708,926

(22) Filed: Apr. 1, 2004

(65) Prior Publication Data

US 2005/0218898 A1 Oct. 6, 2005

(51) Int. Cl.
*G01V 3/10* (2006.01)
*G01V 3/18* (2006.01)

(52) U.S. Cl. .................. 324/342; 324/339; 324/355

(58) Field of Classification Search .......... 324/342, 324/338, 347, 369, 339, 346, 351, 355, 356, 324/366, 368
See application file for complete search history.

(56) References Cited

U.S. PATENT DOCUMENTS

| 2,987,668 | A | 6/1961 | Gondouin |
| 3,408,561 | A | 10/1968 | Redwine et al. |
| 3,993,944 | A | 11/1976 | Meador et al. |
| 4,348,672 | A | 9/1982 | Givler |
| 4,387,372 | A | 6/1983 | Smith et al. |
| 4,496,174 | A | 1/1985 | McDonald et al. |
| 4,525,715 | A | 6/1985 | Smith |
| 4,536,714 | A | 8/1985 | Clark |
| 4,553,097 | A | 11/1985 | Clark |
| 4,659,992 | A | 4/1987 | Clark et al. |
| 4,739,325 | A | * 4/1988 | MacLeod ............. 340/854.4 |
| 4,785,247 | A | 11/1988 | Meador et al. |
| 4,873,488 | A | 10/1989 | Barber et al. |
| 4,949,045 | A | 8/1990 | Clark et al. |
| 4,968,940 | A | 11/1990 | Clark et al. |
| 5,235,285 | A | 8/1993 | Clark et al. |
| 5,339,036 | A | 8/1994 | Clark et al. |
| 5,339,037 | A | 8/1994 | Bonner et al. |
| 5,359,324 | A | * 10/1994 | Clark et al. ........... 340/854.3 |
| 5,428,293 | A | 6/1995 | Sinclair et al. |
| 5,442,294 | A | 8/1995 | Rorden |
| 5,463,320 | A | 10/1995 | Bonner et al. |
| 5,467,832 | A | 11/1995 | Orban et al. |
| 5,530,358 | A | 6/1996 | Wisler et al. |
| 5,563,512 | A | 10/1996 | Mumby |
| 5,594,343 | A | 1/1997 | Clark et al. |
| 6,084,052 | A | 7/2000 | Aufdermarsh et al. |

(Continued)

OTHER PUBLICATIONS www.whatis.com, Induction Coil Reference, p. 1.*

(Continued)

*Primary Examiner*—Patrick J Assouad
*Assistant Examiner*—David M. Schindler
(74) *Attorney, Agent, or Firm*—Bryan White; Darla Fonseca; Dale Gandier

(57) ABSTRACT

A combined resistivity tool incorporating both induction/propagation antennas and lateral resistivity antennas disposed in recesses of downhole tubulars, in which a lateral resistivity antenna includes an insulating base layer disposed in the recess; a toroidal antenna disposed over the insulating base layer; and a shield disposed over the recess.

19 Claims, 15 Drawing Sheets

U.S. PATENT DOCUMENTS

| | | | |
|---|---|---|---|
| 6,098,727 A | 8/2000 | Ringgenberg et al. | |
| 6,100,696 A | 8/2000 | Sinclair | |
| 6,300,762 B1 | 10/2001 | Thomas, Jr. et al. | |
| 6,439,324 B1 | 8/2002 | Ringgenberg et al. | |
| 6,566,881 B2 | 5/2003 | Omeragic et al. | |
| 6,577,129 B1 * | 6/2003 | Thompson et al. | 324/338 |
| 6,630,830 B2 | 10/2003 | Omeragic et al. | |
| 6,670,880 B1 * | 12/2003 | Hall et al. | 336/132 |
| 2003/0016020 A1 | 1/2003 | Gianzero | |

OTHER PUBLICATIONS

M G Chemicals, Potting Epoxy Compound, pp. 1-2.*

* cited by examiner

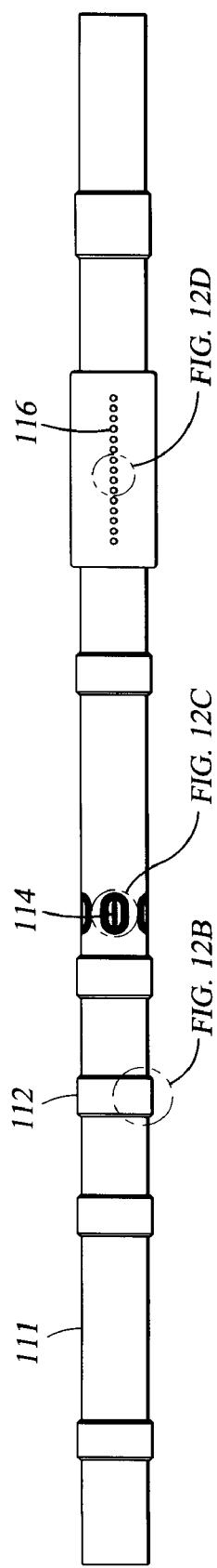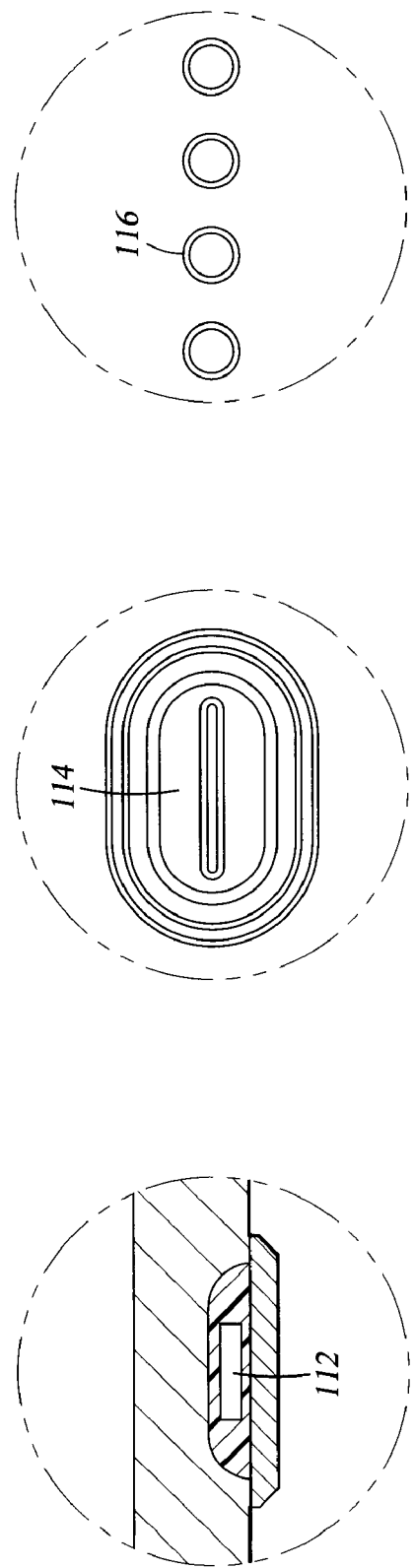

RESISTIVITY LOGGING TOOL AND METHOD FOR BUILDING THE RESISTIVITY LOGGING TOOL

BACKGROUND OF INVENTION

1. Field of the Invention

The invention relates generally to the field of subsurface exploration and production. More particularly, the invention relates to methods and apparatus for measuring resistivity properties of earth formations penetrated by a wellbore.

2. Background Art

Resistivity logging tools have been used for many years to measure the resistivities of earth formations surrounding a borehole. Traditionally, resistivity measurements were obtained by lowering a wireline-conveyed logging device into a wellbore after the wellbore was drilled. However, the wireline measurements necessarily involve a delay between the time a well is drilled and when the measurements are acquired. A preferred approach is to make such measurements while the well is being drilled so that corrective steps may be taken if necessary. For example, wellbore information if available in real time may be used to make adjustments to mud weights to prevent formation damage and to improve well stability. In addition, real time formation log data may be used to direct a drill bit to the desired direction (i.e., geosteering). On the other hand, if the measurements are taken after a delay, drilling fluids ("mud") may have invaded the formation and altered the properties of the near wellbore regions. For these reasons, logging-while-drilling (LWD) and measurement-while-drilling (MWD) techniques have been developed. LWD will be used to include both LWD and MWD techniques in this disclosure.

FIG. 1A illustrates a typical LWD system disposed in a wellbore. A drill string 1 is suspended within a borehole 3 with a drill bit 5 attached at the lower end. The drill string 1 and attached drill bit 5 are rotated by a rotating table 9 while being lowered into the well. This causes the drill bit 5 to penetrate the formation 11. As the drill bit 5 penetrates the formation 11, the mud is pumped down through a central bore of the drill string 1 to lubricate the drill bit 5 and to carry cuttings from bottom hole to the surface via the borehole 3 and mud flow line 13. Located behind drill bit 5 are sections of LWD drill collars 15, which may include an array of resistivity sensors 15a or any other type of sensor known in the art. It will be understood that "sensors", as used in this disclosure, includes antennas, toroids, and electrodes (which may be operated as transmitters and/or receivers). The resistivity sensors 15a measure the resistivity of the formation 11 as the formation 11 is penetrated by the drill bit 5, acquiring the measurements before the mud invades the formation 11.

In general, there are two types of LWD tools for measuring formation resistivity lateral and induction or propagation tools. Each of these tools relies on an electromagnetic (EM) measurement principle. Propagation-type tools emit high-frequency electric fields into the formation to determine borehole and formation responses by measuring voltages induced in the receivers or by measuring difference responses between a pair of receivers or between the transmitter and the receiver. For example, for a propagation tool, incoming signal phases and amplitudes may be measured at each of several receivers with respect to the phases and amplitudes of the signals used to drive the transmitter. Induction-type transmitters generate magnetic fields that induce currents to flow in the formations. These currents generate secondary magnetic fields that are measured as induced voltages in receiver antennas disposed at a distance from the transmitter antenna.

Induction and propagation tools work best in wells drilled in relatively conductive formations using relatively non-conductive muds, including insulating muds (e.g., oil-based muds). Typical induction and propagation tools are not configured to resolve resistivity variations around the wellbore.

Conventional induction or propagation tools use wound coils or solenoids as transmitter and receiver antennas. The antennas are disposed on the instrument by winding a coil around the tool body, encapsulating it in an insulating filler and then sealing the entire assembly with rubber. Although induction tools and propagation tools are generally operated at different frequencies, and in some instances used to probe different subsurface properties (e.g., detecting formation dielectric properties with propagation tools), in most instances they are used in a similar manner to measure formation resistivity. Thus any reference to induction herein is understood to be interchangeable with propagation, and vice-versa.

A lateral tool typically uses one or more antennas or electrodes to inject low-frequency transverse magnetic fields into the formations to determine borehole and formation responses by measuring the current flow through the formations to the receivers. This technique works best in relatively resistive formations drilled with conductive muds, such as water-based muds. Lateral resistivity tools are generally responsive to azimuthal variations in formation resistivities around the borehole.

To transmit a transverse magnetic field into a formation, a lateral tool typically uses a toroidal transmitter, which is built by wrapping a conductive wire around a donut-shaped, magnetically permeable core (a toroidal core). To detect currents that flow in the formation, a lateral tool uses an electrode (e.g. ring electrode or button electrode) receiver or a toroidal receiver. In conventional LWD tools, the toroidal transmitter or receiver is typically built in a sleeve that is slipped onto the drill collar at the final stage of assembly.

FIG. 1B illustrates a typical lateral resistivity tool. As shown, the tool includes two transmitters T1, T2 disposed on a drill collar 15. Two monitor antennas M0 and M2 are also included. The transmitter (current injector) antennas T1, T2 and the monitor antennas M0, M2 are shown as toroidal coils, which will be described in detail below. The resistivity tool may also include other electrode receivers, such as a ring electrode R and button electrodes B, B'. The ring electrode R and the button electrodes B and B' are conductive electrodes disposed on the collar 15, but they are electrically isolated from the collar 15 by insulating materials. A ring electrode R is a conductive metal band disposed around the circumference of the collar 15. The ring electrode R typically measures an azimuthally averaged current. On the other hand, button electrodes B and B' are typically disposed on one side of the tool. The button electrodes B and B' are capable of azimuthal measurements and high-resolution imaging.

As noted above, the induction/propagation sensor works best in relatively low resistivity (or conductive) formations drilled with resistive muds, including oil-based muds. However, such tools are typically not configured to resolve resistivity variations with azimuthal sensitivity around the wellbore. Lateral tools are more suitable for resistive formations drilled with conductive muds, and lateral measurements using button electrodes are generally sensitive to azimuthal variations.

Because the lateral and induction/propagation devices work particularly well in certain environments, they compliment each other. However, a driller may lack the necessary information to make a proper choice regarding the type of tool(s) to use for a particular well. Therefore, different types of logging tools are often used together in a single logging run. In wireline operations, a lateral tool is often run with an induction tool in the same run to provide a shallow depth of investigation and to provide better identification of zones invaded with conductive mud. It is not operationally efficient, nor cost effective, to run these tools on separate passes into the well. In addition, separate logging passes can introduce inaccuracy when trying to determine pre-invasion formation resistivity. Inaccuracy is also introduced because the measurement signal path, with respect to the formation interval and geometry, changes from one logging pass to the next. Therefore, providing different types of sources/sensors in one tool or system for multi-mode resistivity measurements is desirable.

An example of resistivity logging using two types of sensors in a single tool is disclosed in U.S. Pat. No. 5,428,293 issued to Sinclair et al. The logging methods described in this patent use low and high frequency sensors to provide measurements at multiple depths of investigation to monitor mud invasion. Although these methods propose to use a tool having both low and high frequency sensors in the same drill collar, no detail is given as to the construction of the tool.

In designing any sensors for use in an LWD tool, shields that can withstand the abrasive and harsh environments during a drilling operation are essential. Because the lateral and propagation resistivity sensors operate under different EM measurement principles, they have different shield requirements. LWD tools having propagation resistivity antennas built into recesses in the collar wall and fitted with protective shields are known in the art. Propagation tool configurations are further described in U.S. Pat. No. 5,594,343 issued to Clark et al.

FIG. 2A shows a cross-section of a typical drill collar 21 equipped for a propagation resistivity measurement. The collar 21 includes a recess 29 formed circumferentially around the collar exterior to some desired depth. A propagation resistivity sensor 25 is disposed in the recess 29. The collar 21 is equipped with an inner sleeve or chassis 26 disposed therein to form a void to house an electronics module 22. The module 22 is coupled to the sensor 25 via an electrical connection 27 traversing a feedthrough 28 within the drill collar 21 wall. The sensor 25 is potted within the recess 29 (e.g. with fiberglass filling 20) and covered with a rubber overmolding 19. A shield 23 is attached atop the overmolding 19 over the recess 29 to protect the sensor 25 from damage during the drilling process. The collar 21 may also be fitted with a wear band 38 for added sensor protection. As shown in FIG. 2B, the shield 23 includes a plurality of longitudinal slots 24 filled with an insulating material as known in the art.

A lateral resistivity sensor (e.g., a toroidal antenna) induces a magnetic field in the formation. FIG. 3A shows a conventional lateral resistivity sensor that is disclosed in Bonner et al., "*A New Generaton of Electrode Resistivity Measurements for Formation Evaluation While Drilling*," SPWLA, 35$^{th}$ Annual Logging Symposium, Jun. 19-22, 1994, Paper OO, and U.S. Pat. No. 5,339,037 issued to Bonner et al. An LWD collar 31 is shown. A lateral resistivity sensor is constructed as a sleeve 30 that is slipped over the drill collar 31 and fastened in place.

FIG. 3B shows an enlarged portion of the lateral sensor 30 described in the Bonner et al. patent. As shown, a toroidal antenna 35, including a conductive wire 33 wound around a core, is embedded in an insulating material 36 and protected by a metal shield 37. In order to permit a transverse magnetic field to be induced in the formation, the shield for a lateral sensor should not short circuit the current. Only one end, the upper end, of the conductive shield 37 contacts the drill collar 31. U.S. Pat. No. 3,408,561, issued to Redwine et al., describes toroidal antennas having metal protective outer walls. The proposed toroidal antennas are constructed in metal cylinders that are slipped over and screwed onto a drill collar.

There exists a need for downhole tools that provide for the combined acquisition of resistivity measurements using both lateral and propagation/induction types of resistivity sensors. It is also desirable that such tools have the sources/sensors directly integrated on the instrument.

SUMMARY OF INVENTION

The invention provides a lateral resistivity sensor disposed in a recess in a tubular having a longitudinal axis and adapted for subsurface disposal, including an insulating base layer disposed in the recess; a toroidal antenna disposed over the insulating base layer; and a shield disposed over the recess and adapted to prevent electric current flow along the shield in a direction parallel to the longitudinal axis of the tubular near the toroidal antenna.

The invention provides a resistivity logging tool including a propagation or induction resistivity antenna disposed on an elongated tubular having a longitudinal axis and adapted for subsurface disposal; a lateral resistivity sensor disposed in a recess in the elongated tubular; and a shield disposed on the tubular to cover the lateral resistivity sensor and adapted to prevent electric current flow in the shield in a direction parallel to the longitudinal axis of the tubular near the lateral resistivity sensor.

The invention provides a resistivity logging tool including an elongated conductive first tubular having a central bore and an insulated circumferential opening along its wall to prevent current flow across the opening; an elongated conductive second tubular having a lateral resistivity sensor mounted thereon; wherein the second tubular is disposed within the first tubular such that the lateral resistivity sensor is positioned near the insulated circumferential opening in the first tubular; and wherein a current path is formed between the first and second tubular on either side of the insulated circumferential opening when the second tubular is disposed within the first tubular.

The invention provides a method for mounting a lateral resistivity sensor on a section of a tubular having a longitudinal axis and adapted for subsurface disposal. The method includes creating a recess on an outer wall of the tubular section; forming a base layer of an insulating material in the recess; forming a toroidal core by wrapping a magnetically permeable material over the base layer; winding a conductive wire around the toroidal core to form a toroidal antenna; and installing a shield assembly over the recess to cover the toroidal antenna, the shield assembly adapted to prevent electric current flow in the shield in a direction parallel to longitudinal tubular axis near the toroidal antenna.

The invention provides a method for building a resistivity tool using an elongated tubular having a longitudinal axis and adapted for disposal within a subsurface formation. The method includes disposing a lateral resistivity sensor in a recess in the tubular; disposing an induction or propagation resistivity antenna on the tubular; and positioning a shield on the tubular to cover the lateral resistivity sensor and adapted to prevent electric current flow in the shield in a direction parallel to the longitudinal axis of the tubular near the lateral resistivity sensor.

Other aspects and advantages of the invention will be apparent from the following description and the appended claims.

BRIEF DESCRIPTION OF DRAWINGS

FIG. 12A shows a resistivity and imaging LWD tool incorporating a lateral sensor disposed within a recess of the drill collar in accord with the invention.

FIGS. 12B-D are detailed views of the sensors shown in FIG. 12A.

DETAILED DESCRIPTION

Embodiments of the present invention relate to methods and apparatus for measuring EM properties of subsurface formations penetrated by a wellbore. Embodiments of the invention include tools capable of determining resistivities in the same region of a formation using both lateral and induction or propagation EM sensors. Some embodiments of the invention relate to methods for the manufacture or assembly of such tools. According to embodiments of the invention, lateral-type and propagation-type sensors are compatibly implemented within a tubular for subsurface use. Combined implementation of the lateral and the propagation sensors on the same tubular makes it possible to use an integrated sensor shield assembly on the tubular, if so desired. More importantly, the implementation of combined lateral and propagation sensors makes it possible to obtain multi-mode resistivity measurements from the same subsurface region in one pass. Thus providing a more accurate and reliable subsurface resistivity determination.

According to embodiments of the invention, the toroidal sensor for a lateral resistivity tool is built into a downhole tubular. As noted above, toroidal transmitters or receivers of conventional lateral resistivity tools are typically built into a sleeve that is slipped onto the tubular. This design choice is influenced by factors such as physical strength constraints on a drill collar with voids, construction difficulties, and ease of maintenance or replacement. Stress analysis performed by the present inventors showed that a drill collar having recesses cut into its outer wall, of the size and shape required to contain the toroidal sensors, would not significantly weaken the tubular.

Figure 1A:
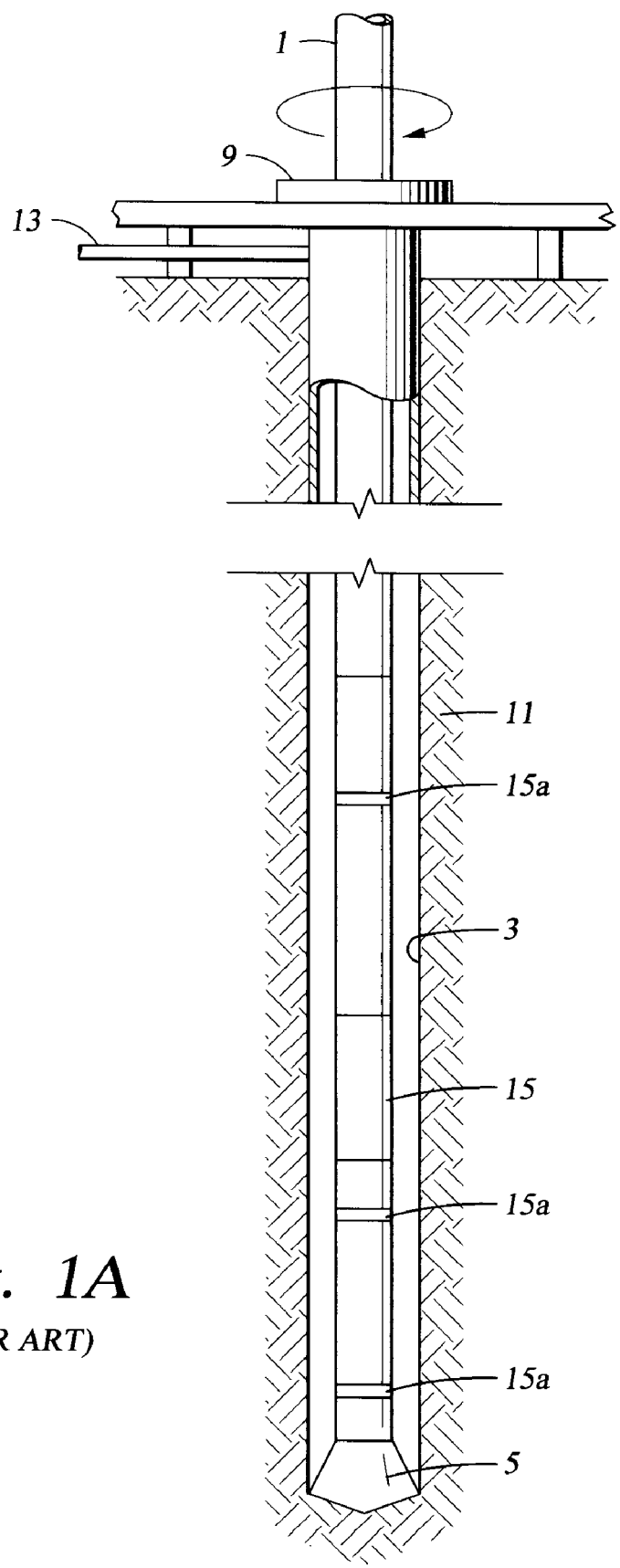
FIG. 1A shows a conventional LWD system with a downhole tool disposed in a wellbore.
Figure 1B:
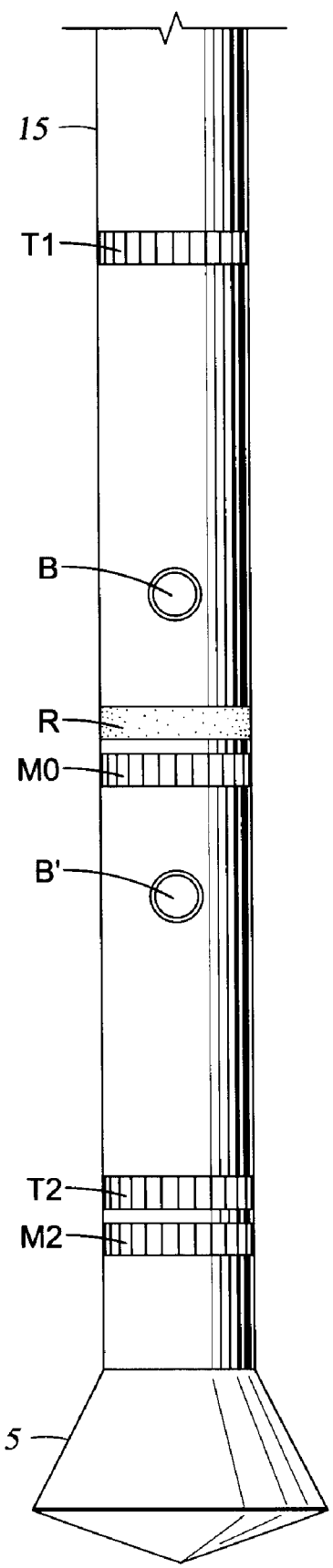
FIG. 1B shows a conventional lateral resistivity logging tool.
Figure 2B:
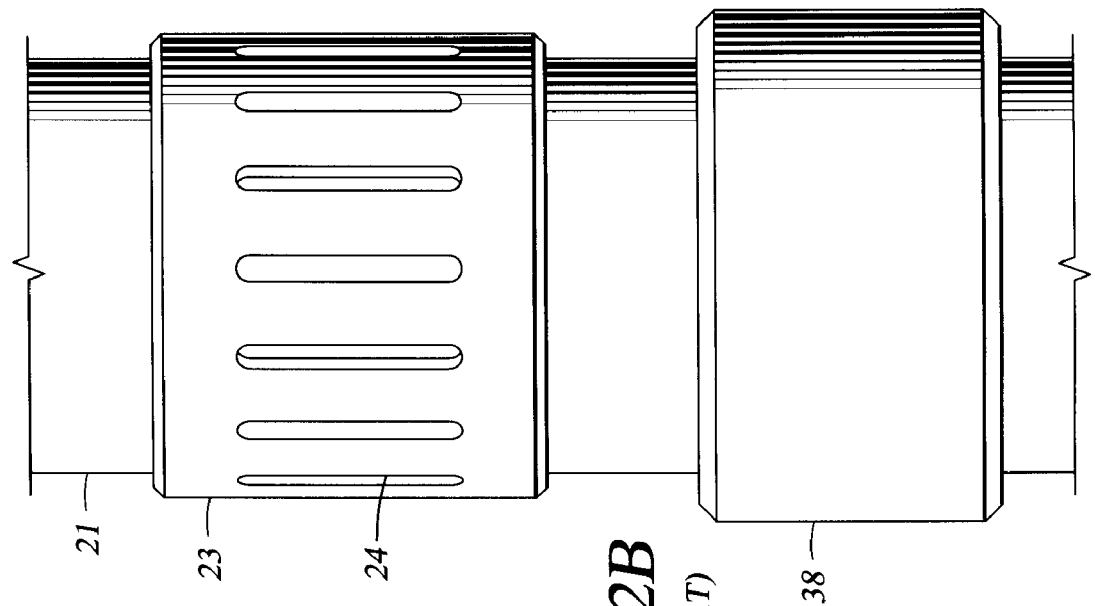
FIG. 2B is a schematic of the tool exterior of FIG. 2A.
Figure 2A:
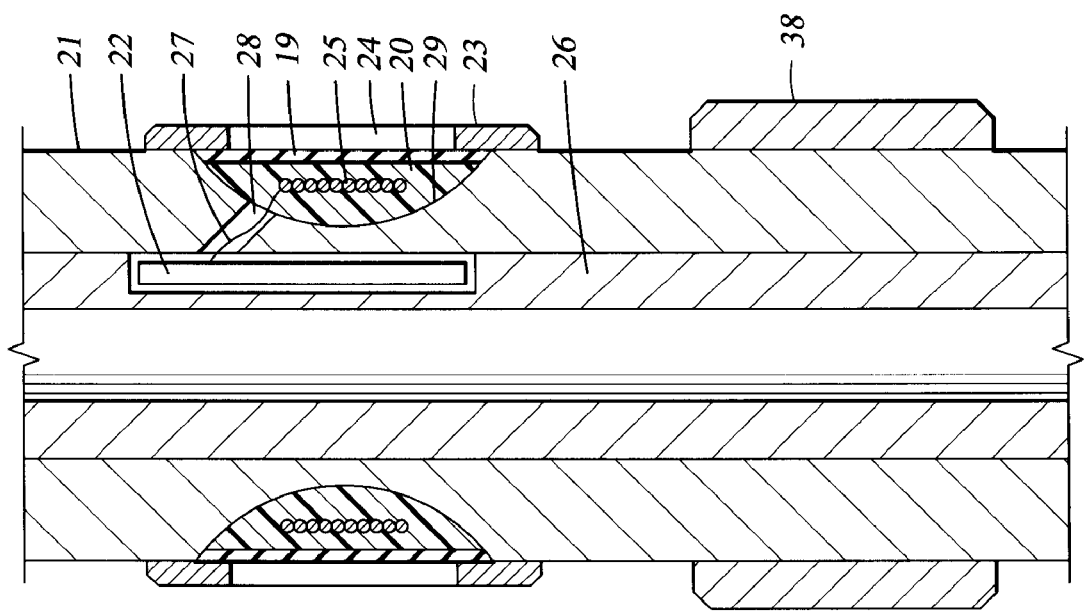
FIG. 2A shows a cross-section of a conventional propagation resistivity logging tool.
Figure 3B:
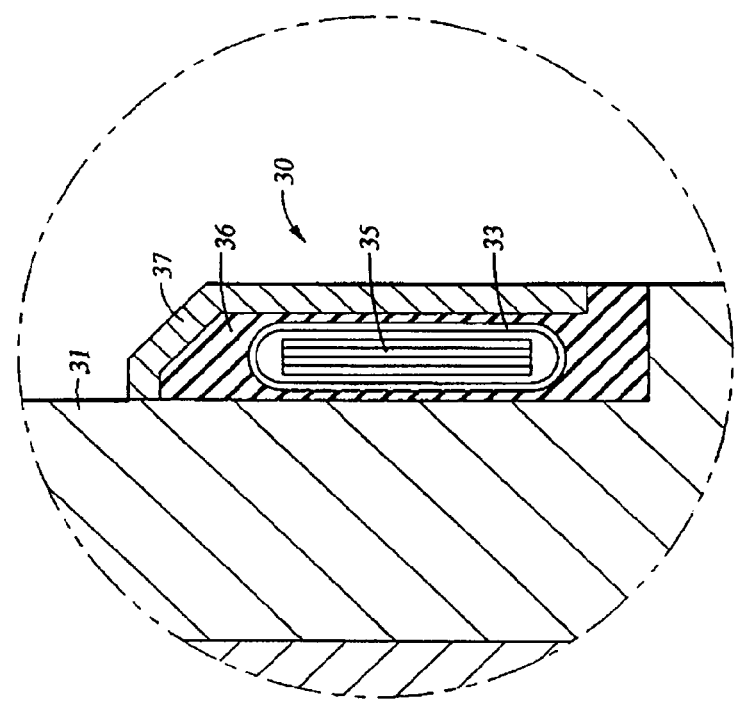
FIG. 3B is a detailed view of the lateral resistivity sensor of the tool of FIG. 3A.
Figure 3A:
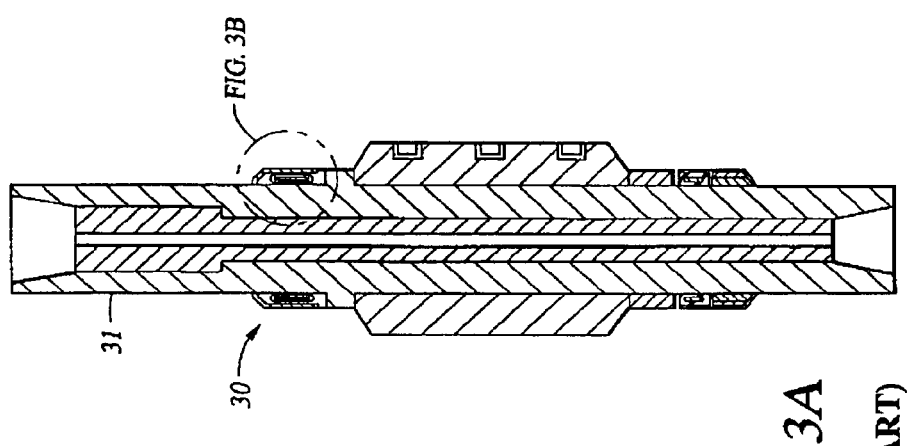
FIG. 3A shows a conventional resistivity logging tool having a sleeve-mounted lateral resistivity sensor.
Figure 4:
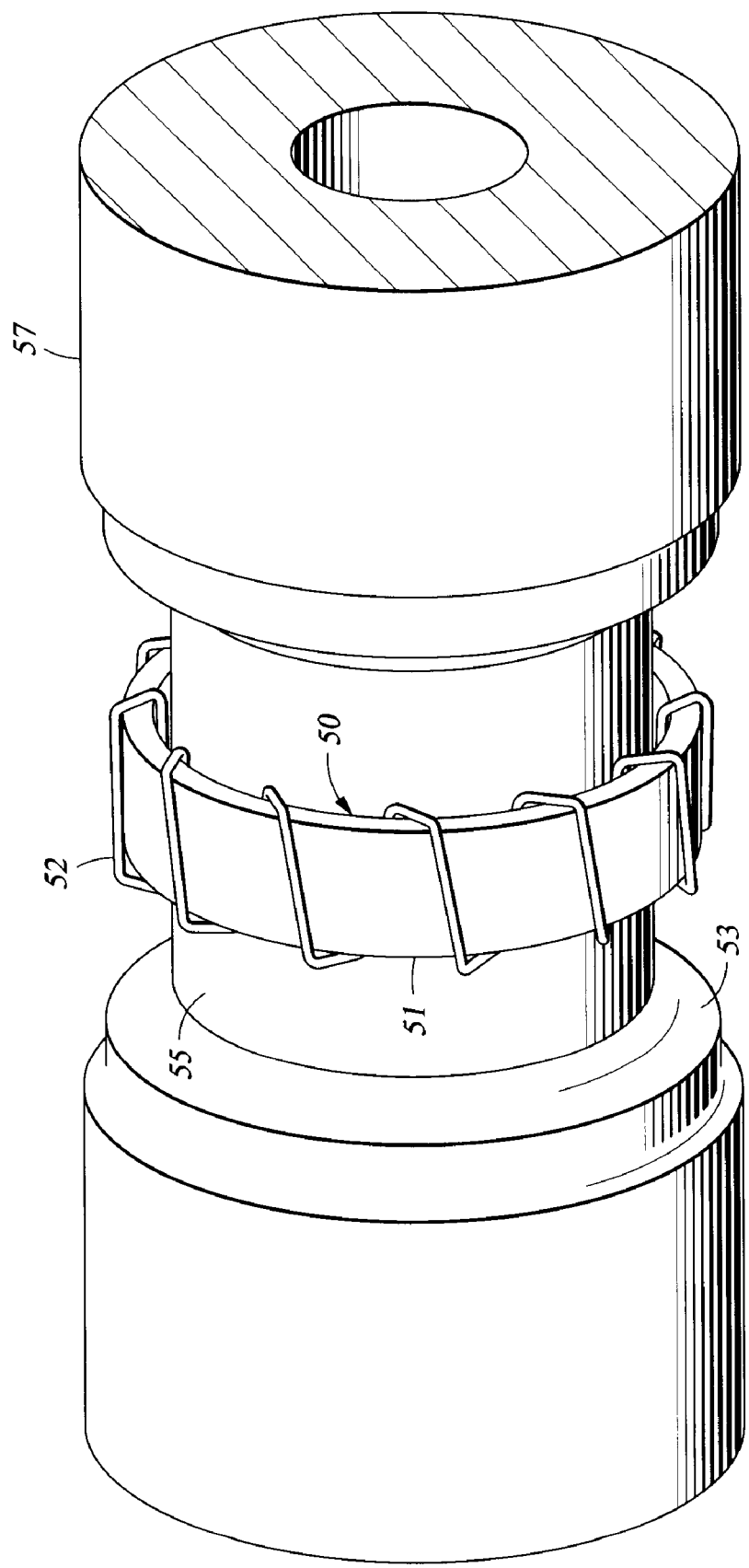
FIG. 4 is a schematic of a toroidal antenna disposed on a tubular in accord with the invention.
Figure 5:
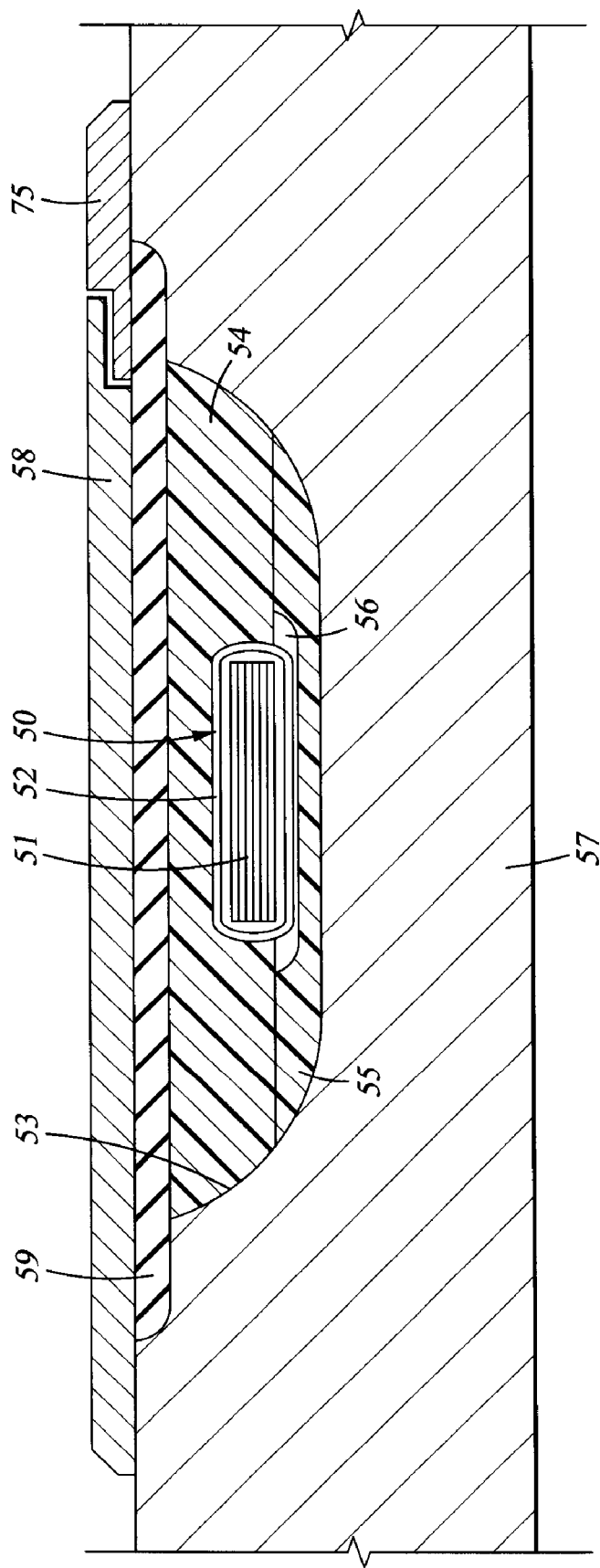
FIG. 5 shows a cross-section of a toroidal antenna built in a recess of a tubular in accord with the invention.

FIG. 4 illustrates a lateral resistivity sensor (a toroidal antenna) built in a recess of a tubular according to an embodiment of the invention. FIG. 5 shows a portion of a longitudinal cross-section of the toroidal sensor. As shown in FIGS. 4 and 5, a tubular 57 includes a recess 53. The base of the recess 53 is cut to some desired depth. A lateral sensor consisting of a toroidal antenna 50, which is made of a magnetic core 51 and conductive wire 52, is built into the recess 53.

According to one embodiment of the invention, the toroidal antenna 50 may be built in place within the recess 53. The toroidal antenna 50 may be built in place by disposing an insulating material at the base of the recess 53 to form a base layer 55. The insulating base layer 55 may include grooves 56 to provide passage for the conductive wire 52 wound around the hoop-shaped magnetic toroidal core 51 in the recess 53.

A magnetic core 51 is built on the base layer 55 in the recess 53. One approach is to build the magnetic core 51 in place by wrapping a tape made of a ferromagnetic material in the recess. Alternatively, a magnetic core may be assembled in the recess from pieces made of a ferromagnetic material (e.g. ferrite). The core 51 may also be assembled in pieces and impregnated with epoxy to hold the structure (not shown). An example of a suitable ferromagnetic tape is a SUPERMALLOY™ tape, which for example may have dimensions of 1 inch (2.54 cm) wide by 0.002 inch (0.05 mm) thick. SUPERMALLOY™ is a highly refined and specially processed 80% nickel-iron alloy for tape-wound core applications and can be obtained from commercial sources such as Magnetic Metals Company (Anaheim, Calif.). SUPERMALLOY™ is manufactured to have high initial permeability and low losses. For some applications, a high-permeability magnetic core may not be required. A core of relative permeability of 1 may suffice. The magnetic tape is wrapped circumferentially around the insulating base layer 55 to form a magnetically permeable toroidal core 51. The wrapping is continued until a desired thickness (e.g., 0.10 inch [0.254 cm] 0.15 inch [0.381 cm]) of the magnetic core 51 is achieved. To complete the toroidal antenna 50, a conductive wire 52 is then wound around the core 51. The winding process, for example, is accomplished by passing the conductive wire 52 through the groove(s) 56 formed in the insulating base layer 55. The lateral resistivity sensor may also be implemented in other ways, such as by slipping the sensor onto a necked-down segment of the tubular or a housing (not shown).

FIG. 5 also shows that once the toroidal antenna 50 is complete, the remainder of the recess 53 may be filled with an insulating material 54, which fixes the toroidal antenna 50 in the recess 53. Examples of suitable insulating materials include epoxy and fiberglass. In addition, a layer of an elastomer (e.g., rubber) 59 may be molded on top of the insulating material to seal the recess 53 and its contents from borehole fluids when the sensor is disposed downhole. Examples of elastomers may include natural or synthetic rubber and synthetic elastomers. An example of a suitable elastomer is a fluoroelastomer sold under the trade name of VITON™ by DuPont Dow Elastomers (Wilmington, Del.). The rubber or elastomer layer 59 seals the sensor assembly flush with the surface of the tubular 57. Finally, the recess 53 and its contents are covered with a protective shield 58, which protects the sensor from the downhole environment. The protective shield 58 includes an insulating mechanism 75 (to be described in detail below) to prevent current flow along the protective shield 58 in the longitudinal direction.

Figure 6:
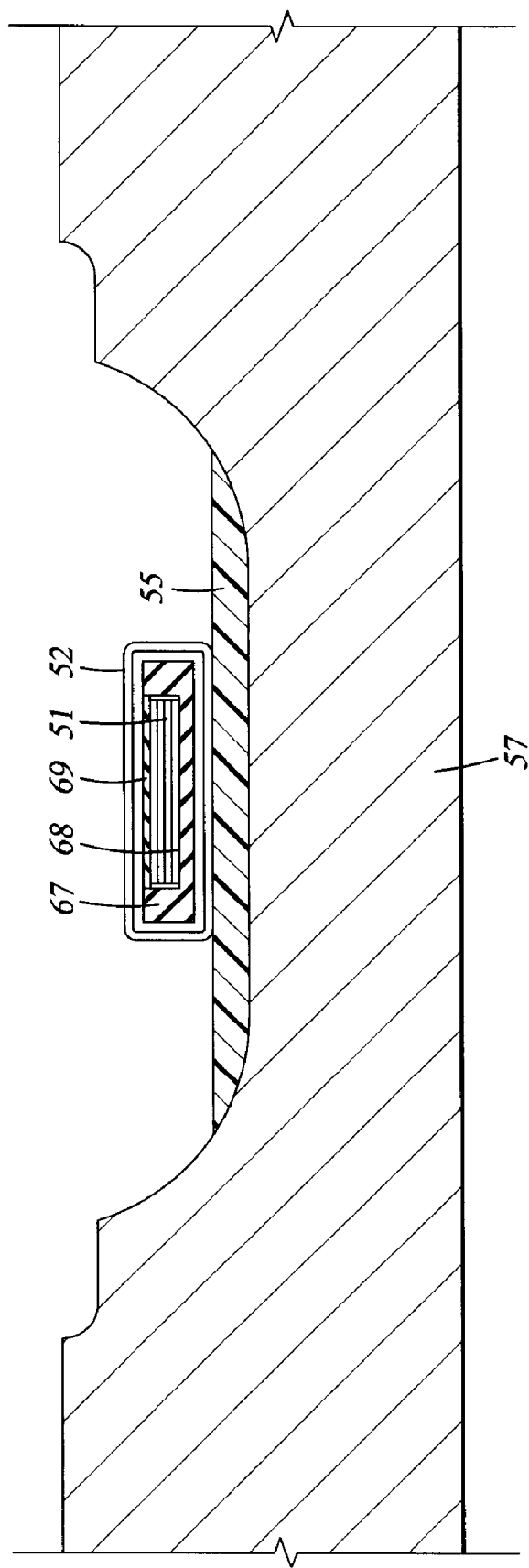
FIG. 6 shows a cross-section of a toroidal antenna having a bobbin as a guide within a recess of a tubular in accord with the invention.

FIG. 6 shows another embodiment of the invention. A toroidal antenna is disposed within the tubular including a bobbin 67 placed over the insulating base layer 55 before the magnetic tape is wrapped. The bobbin 67 is made of an insulating material and may comprise two or more pieces that can be assembled in the recess. The bobbin may include a cutout (trough) 68 that guides the magnetic tape during the wrapping and holds the toroidal core 51. Any suitable material or composite may be used for the bobbin 67, including commercially available materials such as RANDOLITE™, PEEK™, KEVLAR™, fiberglass, or polyaryletherketone-based thermoplastic materials as described in U.S. Pat. Nos. 6,084,052 and 6,300,762. The cutout 68 of the bobbin 67 should be slightly wider than the width of the magnetic tape. If the bobbin 67 is used, then the groove(s) (56 in FIG. 5) used to facilitate winding of the conductive wire 52 may be included in the bobbin 67, instead of the insulating base layer 55. Once the toroidal core 51 is constructed, the top of the trough 68 of the bobbin 67 may be closed with a tape 69 made of an insulating material, such as a glass cloth, to secure the toroidal core 51 in the cutout 68 of the bobbin 67. The protective shield 58, insulating mechanism 75, etc. (shown in FIG. 5), are also incorporated into the embodiment of FIG. 6 but are not shown for clarity of illustration. Other embodiments of the invention may be configured without a magnetic core 51 (not shown), particularly suitable for higher frequency applications. Such embodiments entail disposing the conductive wire 52 over the insulating base layer 55, forming an "air core." Yet other embodiments may be configured with the conductive wire wrapped onto a bobbin 67 without a magnetic core 51 (not shown).

Returning to FIG. 5, the protective shield 58 is preferably constructed of a strong material, such as a metal. The importance of a properly designed shield is well recognized in the art. For example, U.S. Pat. No. 6,566,881 issued to Omeragic et al. discloses various shields for EM logging tools, including those having transverse antennas.

However, the design of a shield for a solenoidal antenna, which produces a magnetic dipole, is different from the design of shields for a toroidal antenna, which produces an electric dipole and operates at much lower frequencies. It is well known in the art that the efficient operation of an antenna and the design of its shield depend on the operating frequencies and the physical characteristics of the antenna. As noted above, an induction or propagation antenna is designed to produce a high frequency electric field into the formation, whereas a toroidal antenna is designed to produce a low frequency magnetic field into the formation. Therefore, conventional shields designed for propagation or induction antennas are generally not suitable for use with a toroidal antenna.

Figure 7A:
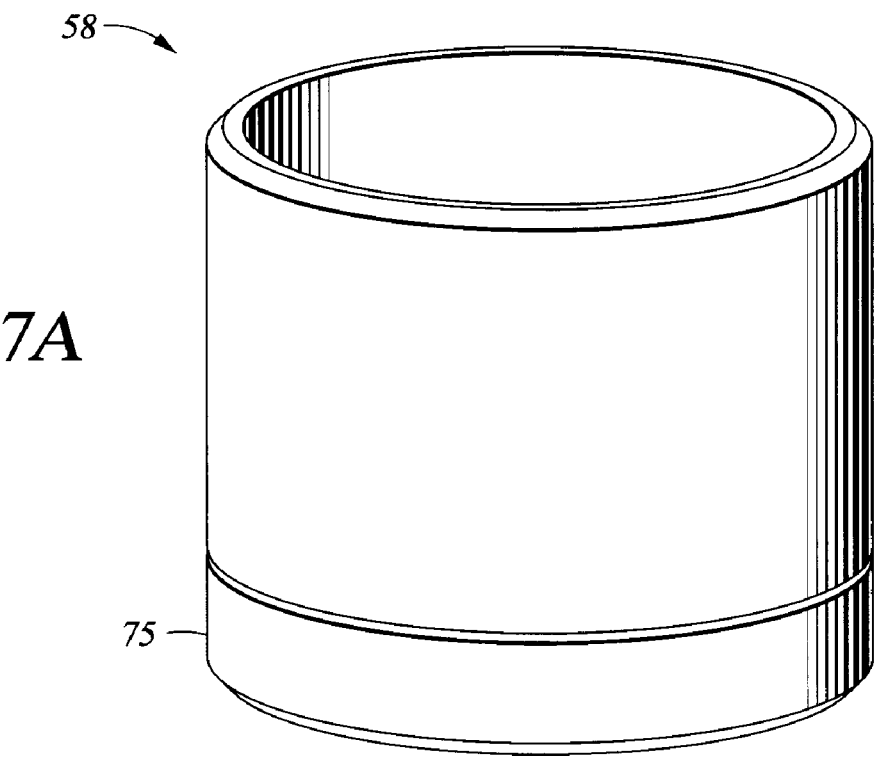
FIG. 7A shows a shield for a lateral sensor in accord with the invention.

Covering a toroidal antenna with a conventional antenna shield would short circuit the electric current induced by the toroidal antenna. Instead of flowing in the borehole and formation, the current would flow primarily in the shield. The formation signal would be reduced below the level suitable for the resistivity measurement. A suitable metal shield for the toroidal antenna includes a circumferential gap or ring to provide electrical insulation between the shield and underlying conductive support. FIG. 7A shows a shield 58 of the invention with an insulating gap 75. This gap 75 is composed of an insulating material (e.g. fiberglass, ceramic, RANDO-LITE™). It may be placed anywhere along the shield, but it is generally easier to construct the insulating gap 75 at one of the shield ends. One skilled in the art can choose a technique from the many known in practice to form the gap. The insulating material can be a separate piece bonded in place or fabricated onto the shield (e.g. molded elastomer or a composite insulating material) as an integral part. In some embodiments, the insulating material may be disposed and captured by a step in the shield (not shown).

Figure 8:
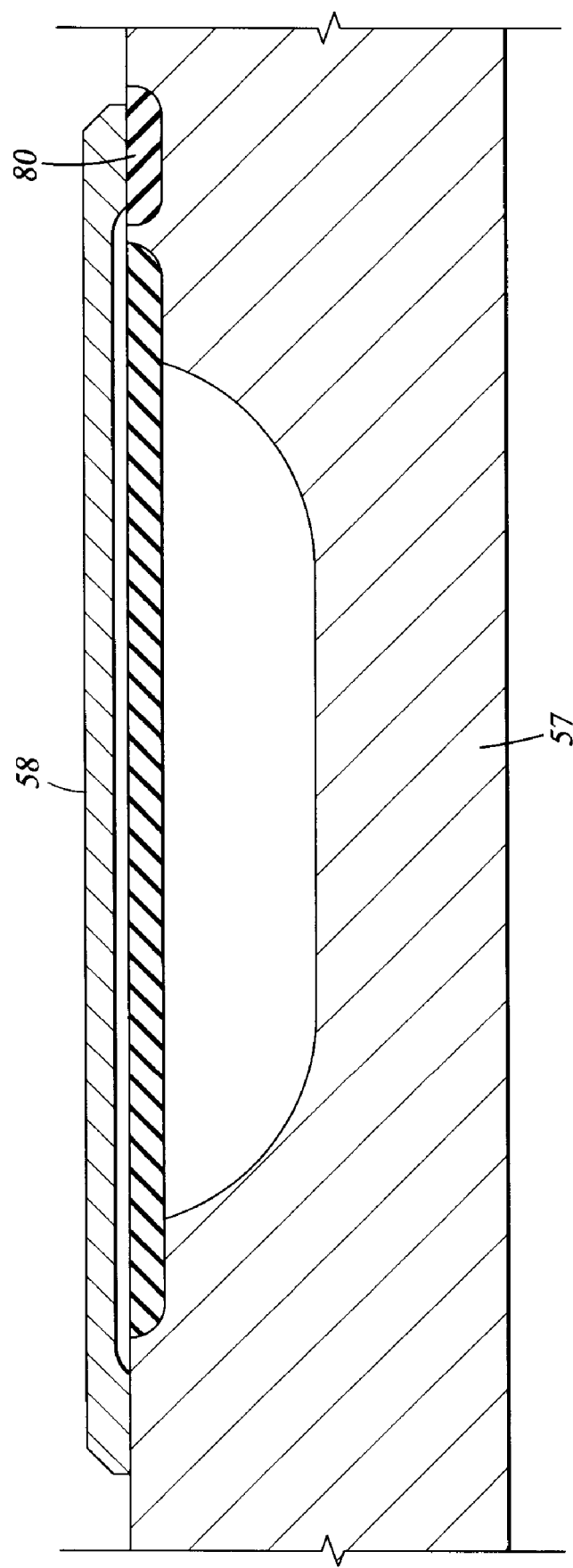
FIG. 8 is a cross-section of a protective shield disposed on a tubular in accord with the invention.

An alternative to incorporating the gap in the shield is to use a one-piece, all-metal shield and mount it in such a way that it does not electrically couple the conductive tubular segment above the toroid with the conductive tubular segment below the toroid. A method of accomplishing this is shown in FIG. 8. As shown in FIG. 8, a ring 80 of an insulating material 80 is incorporated in the tubular 57 such that one end of the shield 58 is isolated from direct contact with the tubular by the ring.

FIGS. 7A and 8 are examples of circumferential gaps or rings with insulating material to prevent current flow along the shield in the longitudinal direction above the toroidal antenna 50. Those skilled in the art will appreciate that other types of circumferential gaps or rings may be used to implement the invention. Some embodiments may include a segmented metallic shield to provide the necessary insulation (not shown).

One skilled in the art will appreciate that when a tubular is disposed into a wellbore filled with mud, a hydrostatic pressure as high as 20,000 psi (1,406 kg/cm$^2$) will act on the toroidal antenna (50 in FIG. 4). This pressure will push inwardly on the toroidal antenna 50 and may cause deformation of the antenna, reducing the magnetic permeability of its core 51, and reducing its inductance and efficiency.

Figure 9:
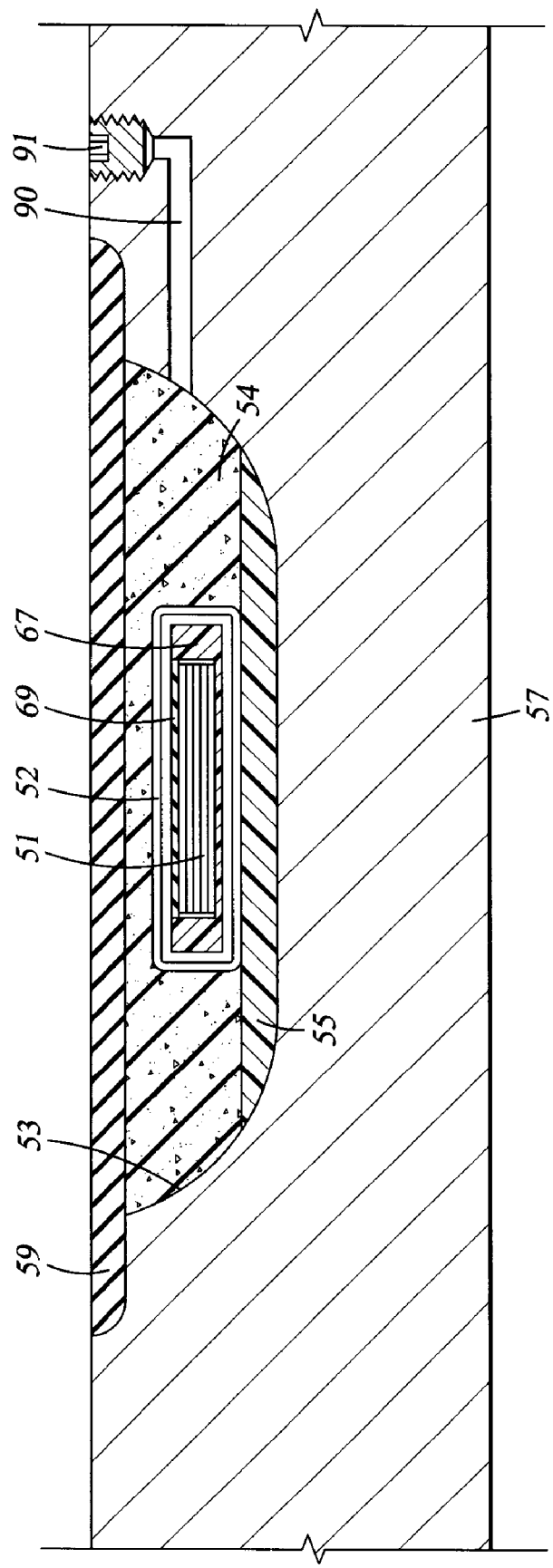
FIG. 9 is a cross-section of a lateral sensor with a pressure compensating mechanism in accord with the invention.

To minimize the adverse effects of the hydrostatic pressure, the toroidal antennas of the invention can be implemented to include a pressure compensating mechanism. For example, pressure compensation may be achieved by replacing some or all of the insulating material (e.g. 54 in FIG. 5) that captures the toroidal antenna in the recess (53 in FIG. 5) with a soft elastomer or rubber. FIG. 9 illustrates an embodiment of a toroidal sensor of the invention that includes a pressure compensation mechanism. The construction is similar to that shown in FIG. 6. One difference is that a port 90 is machined into the tubular wall 57. Another difference is that the filler material 54 is a suitable porous and permeable material, such as un-impregnated fiberglass cloth. After the rubber 59 is molded in place, the recess 53 is evacuated through the port 90 and back-filled with oil under atmospheric pressure. The port 90 is then sealed by a plug 91. The rubber seal 59 acts as a bellows to equalize the pressure on the toroidal core 51 with the pressure outside the tubular.

Figure 10:
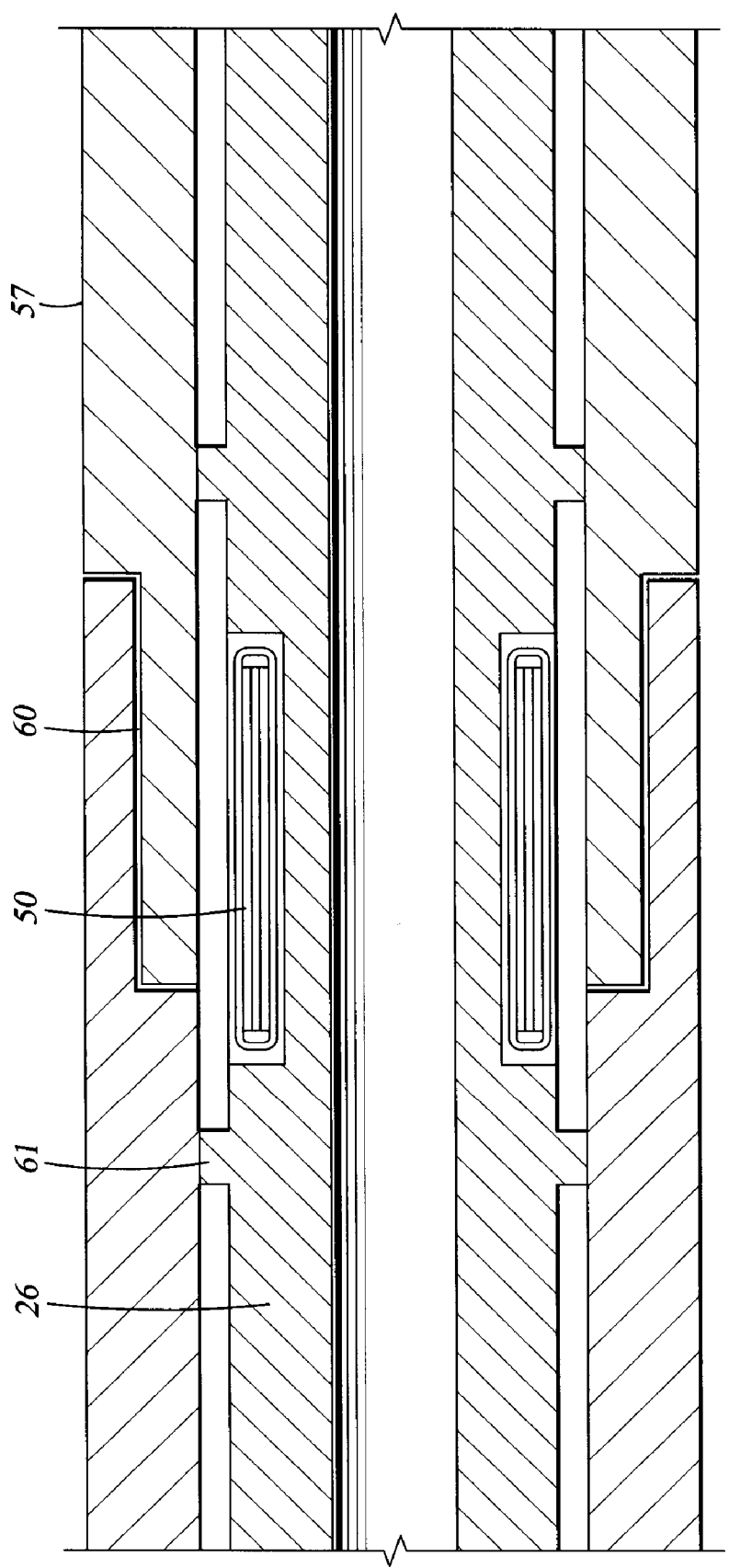
FIG. 10 is a schematic of a tubular with an insulating break or gap in accord with the invention.

FIG. 10 shows another embodiment of the invention. In this embodiment, an electrically insulating opening or break 60 is constructed in a conductive outer tubular 57 and the toroidal antenna 50 is built onto a conductive inner tubular or chassis 26 disposed therein. The break 60 forms an open circuit to current flow along the tubular, preventing the flow across the break 60. On either side of the break 60, a conductive junction 61 is formed between the tubulars to provide a current path between the tubulars. FIG. 10 shows an embodiment wherein the electrically-coupling junctions 61 between the tubulars are implemented via extensions from the chassis 26 exterior providing direct contact with the inner surface of the outer tubular 57. Other suitable means to provide the current path between the tubulars may be used as known in the art. For example, a wave spring may be fitted between the tubulars to provide the conductive element (not shown). Electronics for the antenna 50 may be disposed within the tubulars as described herein or using other means known in the art.

In operation, the toroidal antenna 50 generates a current loop that flows through the chassis 26 and outer tubular 57, returning to the outer tubular 57 through the formation. Thus embodiments of the invention incorporating the insulated break 60 will generally incorporate more than one break, one to generate a voltage difference across the tubular and another to make an axial current measurement using another toroid adapted as a receiver. Downhole tubulars implemented with insulating breaks or gaps are known in the oilfield industry, particularly in the area of telemetry applications. U.S. Pat. No. 6,098,727 issued to Ringgenberg et al. describes downhole pipes with insulating gaps. An insulating shield may also be placed on the exterior of the outer tubular over the insulated break 60 to protect the gap from the environment and to further isolate the break from extraneous currents in the borehole (not shown). Such a shield may be formed of any suitable insulating material and disposed on the tubular as known in the art.

This design offers several advantages: the antenna is mechanically protected by the tubular; the toroid is not exposed to direct wellbore pressure so that the core material maintains a much higher permeability; and feedthroughs or wiring through the outer tubular can be avoided. It also has an advantage over directly driving the gap in that it does not require that the chassis 26 be insulated from the tubular 57, which can be difficult in certain areas, such as around the seal areas between the chassis and the tubular.

A lateral antenna disposed within a tubular has similar characteristics as that of an induction antenna. With these different types of sensors combined in a single tubular, the tool can be used to measure the resistivity of the same subsurface region using two different detection techniques. In addition, it becomes possible to fit an integrated sensor shield to protect the sensors. Note that while it is desirable to have an integrated shield in some situations, separate shields for individual sensors may be used.

Figure 11:
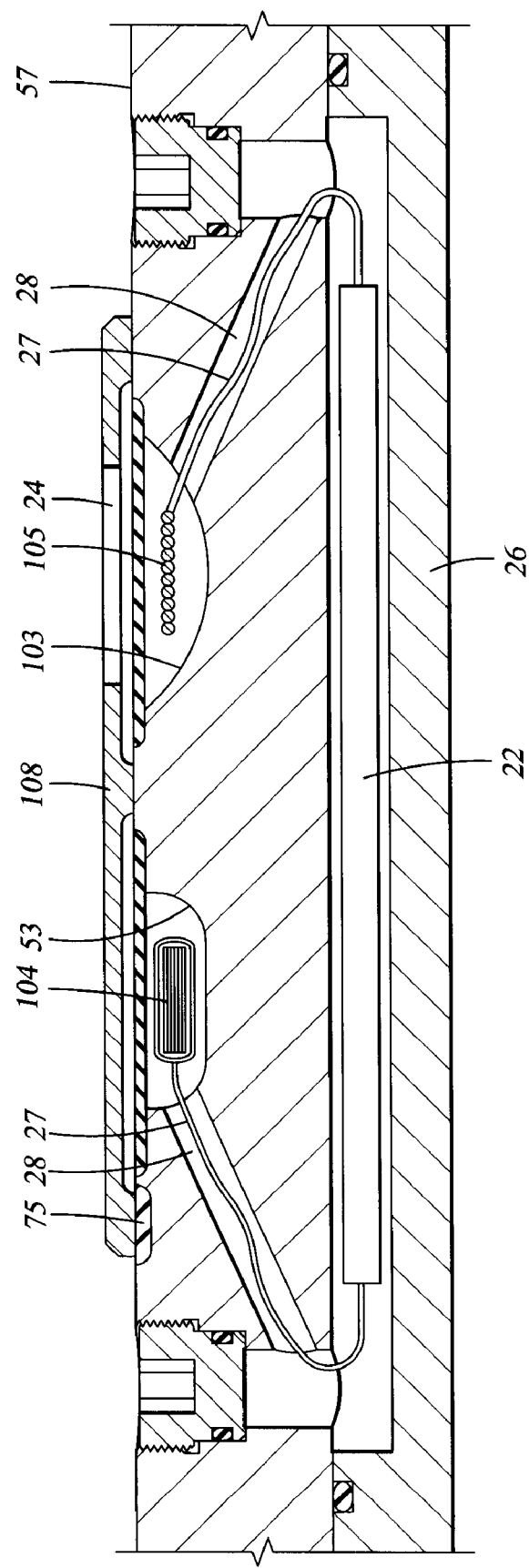
FIG. 11 shows a combined lateral sensor and a propagation sensor disposed on a tubular and protected by an integrated shield in accord with the invention.

FIG. 11 shows another embodiment of the invention. Shown is the cross-section of a tubular section having a lateral resistivity sensor 104 built into a first recess 53 cut into the tubular wall and a propagation resistivity sensor 105 built into a second recess 103 cut into the tubular wall. Electrical connectors 27 traversing feedthroughs 28 within the tubular wall 57 electrically connect the lateral sensor 104 and the propagation sensor 105 to electronics module 102 housed within the chamber formed by the chassis 26. O-rings or other seal means known in the art are used to ensure that the module 102 is not exposed to subsurface fluids.

FIG. 11 also shows an integrated propagation antenna and toroidal antenna shield 108 attached circumferentially around the outer tubular wall. The integrated sensor shield 108 may be made primarily of metal and may be bolted, screwed on, welded, or fastened to the outer tubular surface using any suitable means known in the art. In some embodiments, the integrated shield 108 may be constructed of other durable non-metallic materials known in the art. However, metal is a preferred material in LWD applications due to its strength and durability. The integrated shield 108 includes one or more longitudinal slots 24 over the second recess 103 and the propagation sensor 105. In this embodiment, the insulating gap 75 for the shield 108 is built into the tubular wall near the lateral sensor 104 using any suitable insulating material as known in the art. Other embodiments may be implemented with a lateral resistivity sensor 104 and a propagation resistivity sensor 105 disposed in the same recess (not shown).

Such an embodiment could be implemented by extending the recess to house both sensors and using an integrated shield 108.

As noted above and shown in FIG. 8, the toroidal antenna shield may be an all-metal component provided the shield/tubular assembly is adapted to prevent current flow along the shield across the toroid. In FIG. 11, the insulating gap or ring 75 and the shield design ensure that current flow along the shield is prevented near the lateral sensor 104. Alternatively, a circumferential gap may be built into the shield itself as shown in FIG. 7A.

Figure 7B:
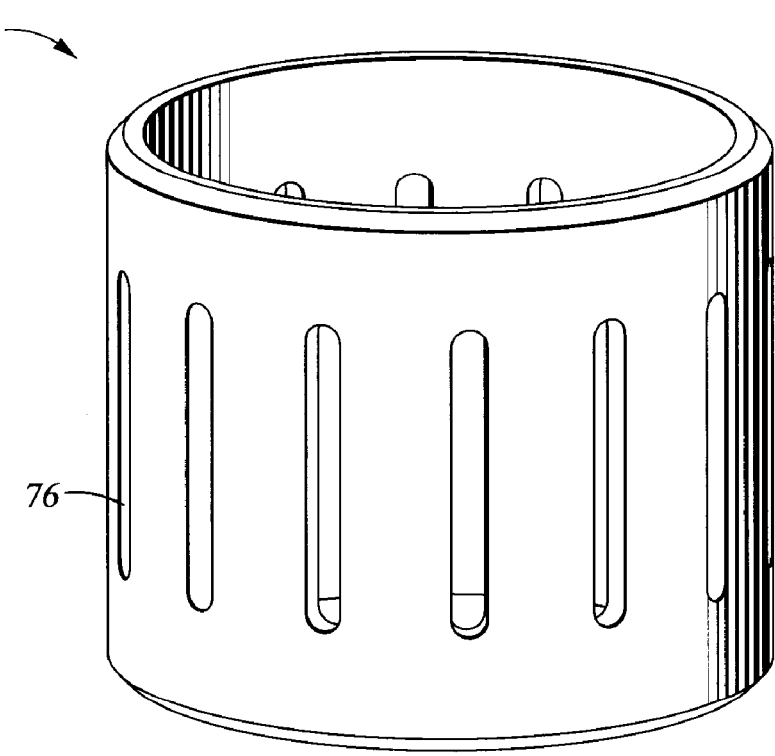
FIG. 7B shows a shield for a resistivity sensor in accord with the invention.

As discussed above, typical propagation-type antennas induce electric fields that cause electric currents to flow circumferential to the tubular support in the borehole and formation. Therefore, propagation antennas generally use shields having longitudinal slots to prevent the induction of transverse (azimuthal) currents in the shield instead of in the formation. FIG. 7B shows one example of a shield 58', with slots 76 filled with an insulating material, that may be used to protect the propagation antennas of the invention. Such shields are further described in U.S. Pat. No. 4,968,940. Note that although several slots 76 are shown, embodiments of the invention are not limited to any particular number or shape of slots. Other embodiments may also be implemented with segmented shields (not shown).

The embodiments illustrated above may have any number of propagation or lateral sensor arrays positioned along the axis of the tubular. In addition, any array spacing can be selected depending on the particular depth of investigation or vertical resolution required.

Methods of the invention allow a toroidal antenna to be built in a recess of a tubular adapted for subsurface use. Applications of these methods are not limited to the resistivity tools described herein. For example, tools or apparatus that currently use toroidal antennas disposed on a sleeve and affixed thereon can benefit from having the antenna built into a recess or void. FIG. 12A shows another embodiment of the invention. FIG. 12A shows a variant of a GeoVision Resistivity tool produced under the trade name of GVR™ by Schlumberger Technology Corporation (Houston, Tex.).

As shown in FIG. 12A, a toroidal antenna 112 is built in a recess (as described herein) on a section of the drill collar 111. FIG. 12B shows the toroidal antenna 112 in greater detail. The tool also includes four large button electrodes 114 to provide azimuthal resistivity measurements (shown in greater detail in FIG. 12C). The tool further includes a series of small button electrodes 116 disposed on a removable stabilizer to provide high-resolution measurements (shown in greater detail in FIG. 12D). The GVR variant shown in FIG. 12 may be implemented in a "slick" design, without a stabilizer. In a slick configuration, the device is significantly smaller in diameter compared to the present GVR tool because the toroidal antennas are built into the recesses in the collar wall rather than slipped onto the drill collar. The slick tool is easier to maneuver in deviated or dog-legged holes and has better hydraulics.

Figure 13:
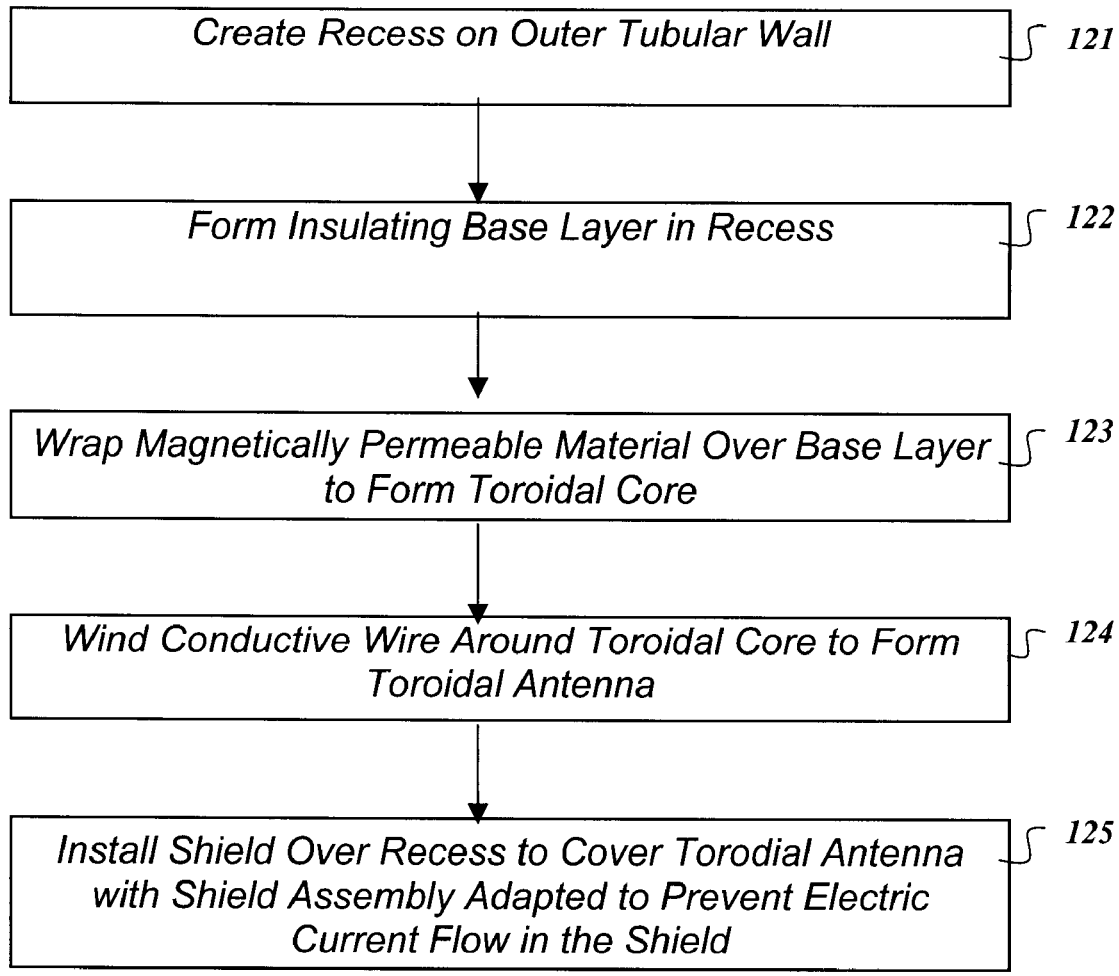
FIG. 13 illustrates a flow chart of a process for mounting a lateral sensor on a tubular in accord with the invention.

An embodiment of the invention relates to a process for mounting a lateral resistivity sensor on a section of an elongated tubular adapted for subsurface disposal. FIG. 13 outlines the process. First, a recess of a proper depth is created or cut on the outer wall of the tubular section (step 121). The depth should be sufficient to accommodate the antenna assembly, but not too deep as to unnecessarily weaken the tubular. A stress analysis may be performed first to determine if the required depth is obtainable without unduly weakening the tubular.

Next, an insulating material is placed (or coated) at the base of the recess to form an insulating base layer between the toroidal antenna and the conductive tubular (step 122). Various insulating materials may be used as known in the art, including fiberglass, PEEK™, etc. The thickness of this base layer of insulating material should be chosen to provide adequate insulation without excessive buildup. For example, a layer of 0.04 inch (1.0 mm) of fiberglass may be used as a base layer. A pressure compensation mechanism may optionally be built on the base layer to provide support for the toroidal antenna.

A toroidal core is built in the recess on the base layer using a magnetically permeable material, such as SUPERMALLOY™ tape (step 123). A tape of a proper size is used depending on the desired dimensions of the toroidal antenna. For example, a Permalloy having a dimension of 1 inch (2.54 cm) wide and 0.02 inch (1.0 mm) thick may be used to wrap a core having a thickness ranging from 0.1 inch (2.54 mm) to 0.15 inches (3.8 mm). In some embodiments, a bobbin made of an insulating material may be used to guide the tape wrapping process. A suitable bobbin, for example, may be made of fiberglass and has a trough or cutout (e.g., 1.05 inch (2.7 cm) wide and 0.18 inch (0.5 cm) deep) that can accommodate the width of the tape. If a bobbin is used, the top side of the bobbin may be covered with an insulating material (e.g. insulating tape or glass cloth) to secure the toroidal core in the trough of the bobbin and to insulate the windings.

Once the toroidal core is formed, a coated conductive wire is wrapped or wound around the core to finish the antenna (step 124). A suitable conductive wire, for example, is an HML coated magnet wire. To facilitate the wrapping of the wire, grooves may be cut in the base layer or the bobbin to provide passages for the wire.

The remaining space in the recess may then be filled with an insulating material. A suitable insulating material, for example, may be selected from epoxy, fiberglass, etc. An insulating filling will hold the toroidal antenna in place and also insulate the antenna from the conductive collar. A layer of rubber or elastic material can also be molded over the top of the insulating material and onto the tubular to seal the entire antenna assembly from borehole fluids. In step 121, the recess may be created with a two-tiered or stepped depth profile (See e.g., FIGS. 5, 6, 8) to facilitate molding the rubber layer flush with the surface of the tubular. Suitable elastic materials include a fluoroelastomer sold under the trade name of VITON™ by DuPont Dow Elastomers (Wilmington, Del.). A relatively thin rubber or elastic layer (e.g., 0.05 inch [1.3 mm] thick) provides a reliable seal.

Finally, a protective shield may be placed over the recess to protect the toroidal antenna assembly (step 125). As noted above, the protective shield is preferably metallic. The shield assembly is adapted to prevent electric current flow in the vicinity of the toroidal antenna between the tubular sections above and below the antenna (i.e., in a direction parallel to the longitudinal axis of the tubular). Electrical insulation may be provided by a circumferential gap filled with an insulating material disposed in the shield itself or at the junction between the shield and the tubular, as described above.

Figure 14:
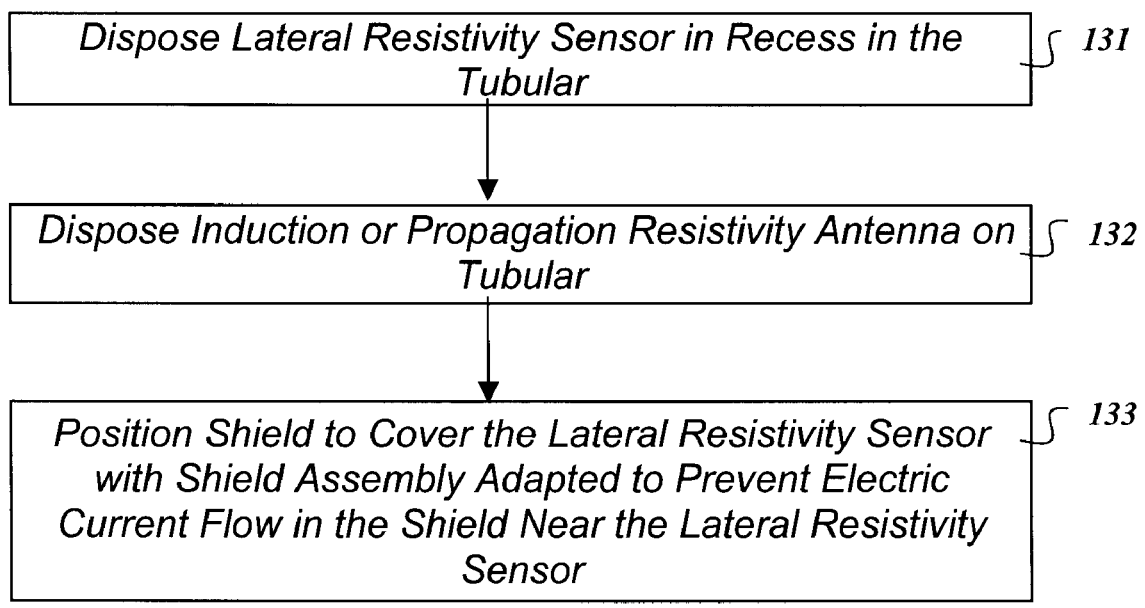
FIG. 14 illustrates a flow chart of a process for building a combination of lateral and propagation sensors on a tubular in accord with the invention.

FIG. 14 is a flow chart illustrating a process for building a resistivity tool using an elongated tubular adapted for subsurface disposal according to the invention. The process begins by disposing a lateral resistivity sensor in a recess within the tubular as described herein (step 131). An induction or propagation resistivity antenna is also disposed on the tubular as described herein (step 132). Lateral resistivity antennas may be built according to the techniques disclosed herein. Induction/propagation antennas and electrodes may be built using methods known in the art. In preferred embodiments, the lateral resistivity sensors are located in close proximity to the propagation sensors so that they measure substantially the same vertical regions of the formation at the same time. Other embodiments may include multiple arrays of lateral resistivity sensors and induction or propagation resistivity antennas. The number and spacings of these arrays are designed to provide measurements at desired depths of investigation.

Finally, a shield assembly is positioned on the tubular to cover and protect the lateral resistivity sensor (step 133). An individual shield may be used for the lateral resistivity sensor, or an integrated shield may be used to protect multiple antennas. The shield assembly should be adapted to prevent electric current flow in the vicinity of the sensor between the tubular sections above and below the sensor (i.e., in a direction parallel to the longitudinal axis of the tubular). Electrical isolation is provided as described herein depending on the type of the antenna.

The advantages afforded by embodiments of the present invention include efficiency, versatility and accuracy. This invention permits fabrication of a dual array of both types of resistivity sensors on a single downhole tool, all positioned in close proximity to one another. Since the different types of sensors can be located in close proximity to one another, the introduction of measurement error due to depth offsets, different logging times, and different signal path geometry, is minimized.

One skilled in the art will appreciate that the present invention offers additional advantages including dual resistivity measurements that are suited to different, but frequently coincident, logging needs. The reliability of the lateral resistivity measurement is also greatly improved because the sensors are built into the tubular and adequately shielded to provide superior durability, particularly in while-drilling operations. Building the lateral sensor in a recess in a tubular also reduces the diameter of the resistivity tool and expands the range of hole sizes and well angles of curvature that the downhole tool can be used in.

Improved operating efficiency is achieved due to longer running times as sensors wear out less frequently. Furthermore, reducing the wear and damage frequency of sensors translates into lower maintenance costs. Because both types of sensors are built in a similar fashion and on the same downhole tool, manufacturing costs are also reduced.

While the invention has been described with respect to a limited number of embodiments, those skilled in the art will appreciate that other embodiments can be devised which do not depart from the scope of the invention. For example, a toroid of the invention may be disposed on a downhole tubular for use as a choke to prevent current flow in the tubular to reduce signal interference. The present invention is applicable to all sectors and applications within the oilfield industry, including LWD, wireline, coiled tubing, casing-while-drilling, and reservoir monitoring applications. It will also be appreciated that embodiments of the invention may be implemented with any conventional propagation or induction antennas, including those having tilted axes or multiple coils.

The invention claimed is:

1. A resistivity logging tool, comprising:
   a propagation or induction resistivity antenna disposed on an elongated tubular having a longitudinal axis and adapted for subsurface disposal;
   a recess in an outer wall of the tubular and extending circumferentially about the longitudinal axis of the tubular, wherein the recess recedes from a first edge at the outer wall of the tubular and from a second edge at the outer wall of the tubular, the first edge being spaced longitudinally across the recess from the second edge;

a lateral resistivity sensor disposed in the recess in the elongated tubular;

a shield disposed on and about the outer wall of the tubular and extending across the recess to cover the recess and the lateral resistivity sensor, and an insulating mechanism including a circumferential gap, the circumferential gap being located separately from the recess and extending continuously about the tubular to prevent electric current flow in the shield in a direction parallel to the longitudinal axis of the tubular near the lateral resistivity sensor.

2. The resistivity logging tool of claim 1, wherein the lateral resistivity sensor comprises a toroid.

3. The resistivity logging tool of claim 1, further comprising an electrode disposed on the tabular, the electrode selected from one of a ring electrode, a button electrode, and a combination thereof.

4. The resistivity logging tool of claim 1, wherein the lateral resistivity sensor comprises: an insulating base layer disposed in the recess in the tubular; and a toroidal antenna disposed over the insulating base layer.

5. The resistivity logging tool of claim 4, wherein the toroidal antenna comprises a conductive wire disposed over the insulating layer.

6. The resistivity logging tool of claim 4, wherein the toroidal antenna comprises a toroidal core formed from one of a magnetically permeable material wrapped in the tubular recess or a ferrite material disposed in the recess.

7. The resistivity logging tool of claim 1, wherein the lateral resistivity sensor includes a pressure compensating mechanism.

8. The resistivity logging tool of claim 1, wherein the circumferential gap is a continuously extending gap incorporated in the shield.

9. The resistivity logging tool of claim 8, wherein the circumferential gap is filled with an insulating material.

10. The resistivity logging tool of claim 1, wherein the circumferential gap is incorporated in the tubular away from the recess and includes an electrically insulating material disposed between a junction formed between the shield and the tubular.

11. The resistivity logging tool of claim 1, wherein a section of the shield positioned over the induction or propagation resistivity antenna comprises at least one slot filled with an insulating material.

12. The resistivity logging tool of claim 1, wherein said recess contains both the induction or propagation resistivity antenna and the lateral resistivity sensor.

13. The resistivity logging tool of claim 1, wherein the tubular is a drill collar.

14. The resistivity logging tool of claim 1, wherein the circumferential gap is incorporated into the tubular and positioned between the shield and the tubular.

15. A method for building a resistivity tool using an elongated tubular having a longitudinal axis and adapted for disposal within a subsurface formation, comprising:

disposing a lateral resistivity sensor in a recess in the tubular;

disposing an induction or propagation resistivity antenna on the tubular, wherein the recess is in an outer wall of the tubular and extends circumferentially about the longitudinal axis of the tubular, wherein the recess recedes from a first edge at the outer wall of the tubular and from a second edge at the outer wall of the tubular, the first edge being spaced longitudinally across the recess from the second edge;

positioning a shield assembly on and about the outer wall of the tubular and extending across the recess to cover the recess and the lateral resistivity sensor; and extending a circumferential gap continuously about the tubular and separately from the recess, and electrically between the shield assembly and the tubular, thereby preventing electric current to flow along the shield in a direction parallel to the longitudinal axis of the tubular near the lateral resistivity sensor.

16. The method of claim 15, wherein disposing the lateral resistivity sensor comprises: disposing a base layer of an insulating material in the recess in the tubular; and assembling a toroidal antenna comprising a toroidal core and a conductive wire wound around the toroidal core, wherein the toroidal core comprises a magnetically permeable material wrapped around the insulating base layer.

17. The method of claim 15, further comprising adapting the recess in the tubular with a pressure compensating mechanism.

18. The method of claim 15, wherein the circumferential gap is incorporated in the shield assembly and is filled with an insulating material.

19. The method of claim 15, further comprising disposing an electrically insulating material between a junction formed between the shield and the tubular.

* * * * *